Feb. 19, 1952  J. S. KOPAS  2,586,234
TESTING DEVICE
Filed Oct. 26, 1949  4 Sheets-Sheet 1

WITNESS
Clyde H. Haynes

INVENTOR.
BY Joseph S. Kopas
Woodling and Krost
his attys

Feb. 19, 1952    J. S. KOPAS    2,586,234
TESTING DEVICE
Filed Oct. 26, 1949    4 Sheets-Sheet 2

WITNESS

INVENTOR.
Joseph S. Kopas
BY Woodling and Knost
his Attys

Feb. 19, 1952  J. S. KOPAS  2,586,234
TESTING DEVICE
Filed Oct. 26, 1949  4 Sheets-Sheet 3

WITNESS

INVENTOR.
Joseph S. Kopas
BY Woodling and Krost
his attnys

Feb. 19, 1952  J. S. KOPAS  2,586,234
TESTING DEVICE
Filed Oct. 26, 1949  4 Sheets—Sheet 4

WITNESS
Clyde H. Haynes

INVENTOR.
Joseph S. Kopas
BY Woodling and Krost
his attnys

Patented Feb. 19, 1952

2,586,234

UNITED STATES PATENT OFFICE 2,586,234

TESTING DEVICE

Joseph S. Kopas, Cleveland, Ohio

Application October 26, 1949, Serial No. 123,729

17 Claims. (Cl. 35—9)

My invention relates in general to a machine for recording mental responses to questions and in particular to a machine having a control device which is dependent on and responds to the one answer section of several answer sections of a question card.

In the past, automatic test boards have been limited to approximately 60 questions and therefore were restricted to a rough testing of the abilities, intelligence, aptitudes, and other attributes of the person taking the test. Many questions are required to give a person a complete ability, knowledge, interest, preference, personality, aptitude or other test. The present invention is capable of automatically scoring the mental responses to any number of questions with the result immediately available upon completion of the test.

In this new testing machine, questions are placed on cards or similar members having several answer sections, wherein each answer section represents a different possible answer to the question on the card. These cards are inserted or positioned one at a time in the machine with the answer section of the card, representing the answer being given to a question appearing on the card, causing operation of the machine and a scoring of the answer represented by that answer section of the card. Answers or mental responses to questions, which were formerly graded or summarized, can now be placed on these cards and the positioning of the cards in the machine will indicate the mental choice of answer with the machine recording and summarizing the answers.

Therefore, one of the objects of my invention is to provide a machine for recording the mental responses to a plurality of questions.

Another object of my invention is to provide an automatic machine for recording mental responses which is capable of handling and automatically summarizing the answers given to any number of questions.

Another object of my invention is to provide a multiple choice card which may have a question printed thereon and which has a plurality of answer sections, each representing a different possible answer to the question.

Another object of my invention is to provide a multiple choice card which may have a question printed thereon and which has a plurality of sides, each representing a different possible answer to the question.

Another object of my invention is to provide a control unit for controlling a plurality of counters wherein the control unit is adapted to respond to one of several answer sections of a multiple choice question card.

Another object of my invention is to provide a control unit for controlling a plurality of counters wherein the control unit is adapted to respond to one of several sides of a multiple choice question card.

Another object of my invention is to provide a testing machine with counters wherein each counter is controlled by an electrical element responsive to a portion of or to an opening in a question card.

Still a further object of my invention is to provide an automatic testing machine having counters energized through a conducting bar and a plurality of contacts, one for each counter, wherein the contacts engage this bar for controlling the operation of the counters.

Further objects and a fuller understanding of my invention may be had by referring to the accompanying drawings, in which.

Figure 1:
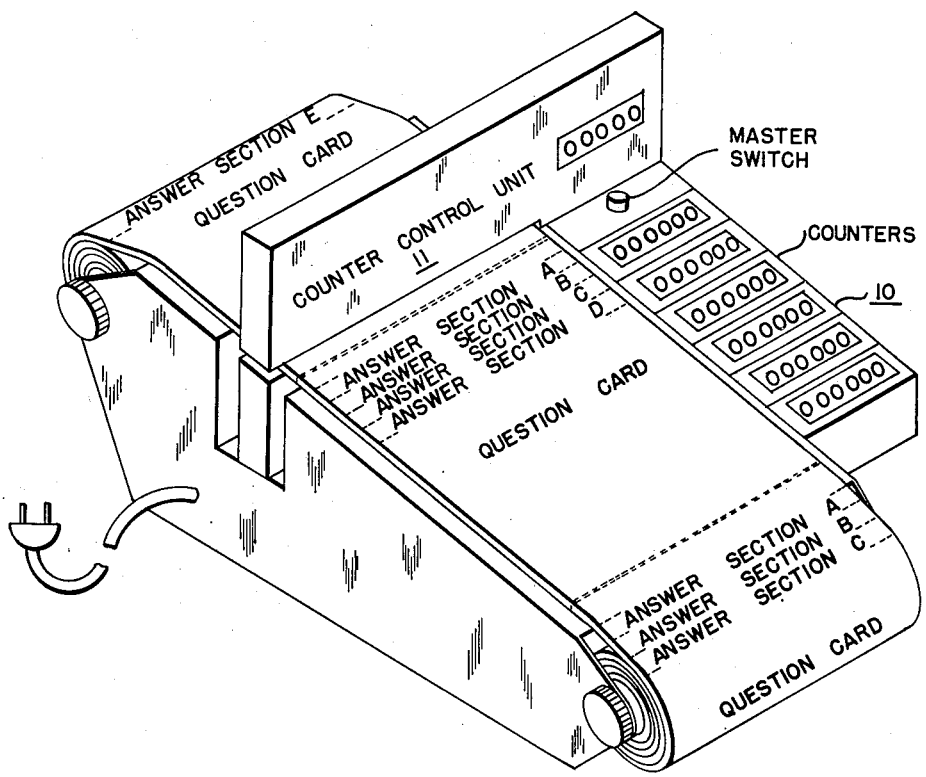
Figure 1 is a perspective view of a testing machine.

In Figure 1 of my drawings, I have illustrated in perspective, my testing machine which records the mental responses to questions printed on question cards. The question card may be conveniently connected together to provide a long series or roll of cards. Each of the question cards has a plurality of answer sections, such as answer sections A, B, C and D, wherein each answer section represents a different possible answer to the question. The testing machine has electrically operated counters 10 for recording the answers given to the questions and for summarizing the result of the test, with the result or grade available immediately upon completion of the test. The operation of these counters 10 is controlled by a counter control unit 11 which is responsive to or affected by the answer section of the question card aligned therewith, thus making the operation of the counters dependent on the answer section aligned with and influencing the counter control unit.

The question card may be constructed of any suitable design and material, the term "card" herein being referred to in a broad sense. Many question cards may also be connected together into a group of individual cards for easier handling. An example of this connecting is to have a roll or series of interconnected cards as illustrated in Figure 1.

The answer sections of a card may be arranged in any convenient order whereby each answer section can readily be aligned with the control unit. For example, the answer sections are adjacently positioned in Figure 1, and are positioned around the sides of the card in other figures. Each answer section of a card has means influencing or affecting the control unit. Examples of different means which may be used to affect the counter control unit are openings or notches, conductive and non-conductive portions, magnetizable material and light reflecting or transmitting material.

The counter control unit is affected or influenced by the answer section of a card aligned therewith. This control unit may be constructed from pairs of elements in direct electrical contact and adapted to receive the answer section with the openings permitting this direct contact. Conductive portions in the answer section will also complete an electrical circuit in the control unit. The control unit may also be in the form of light means and electro-magnetic means which are affected or influenced by the respective means in the answer section.

I have found that a suitable master switch, such as a push-button switch, may be used to insure operation of the counters by the control unit after the desired answer section of the question card has been aligned properly with respect to the control unit.

Figure 2:
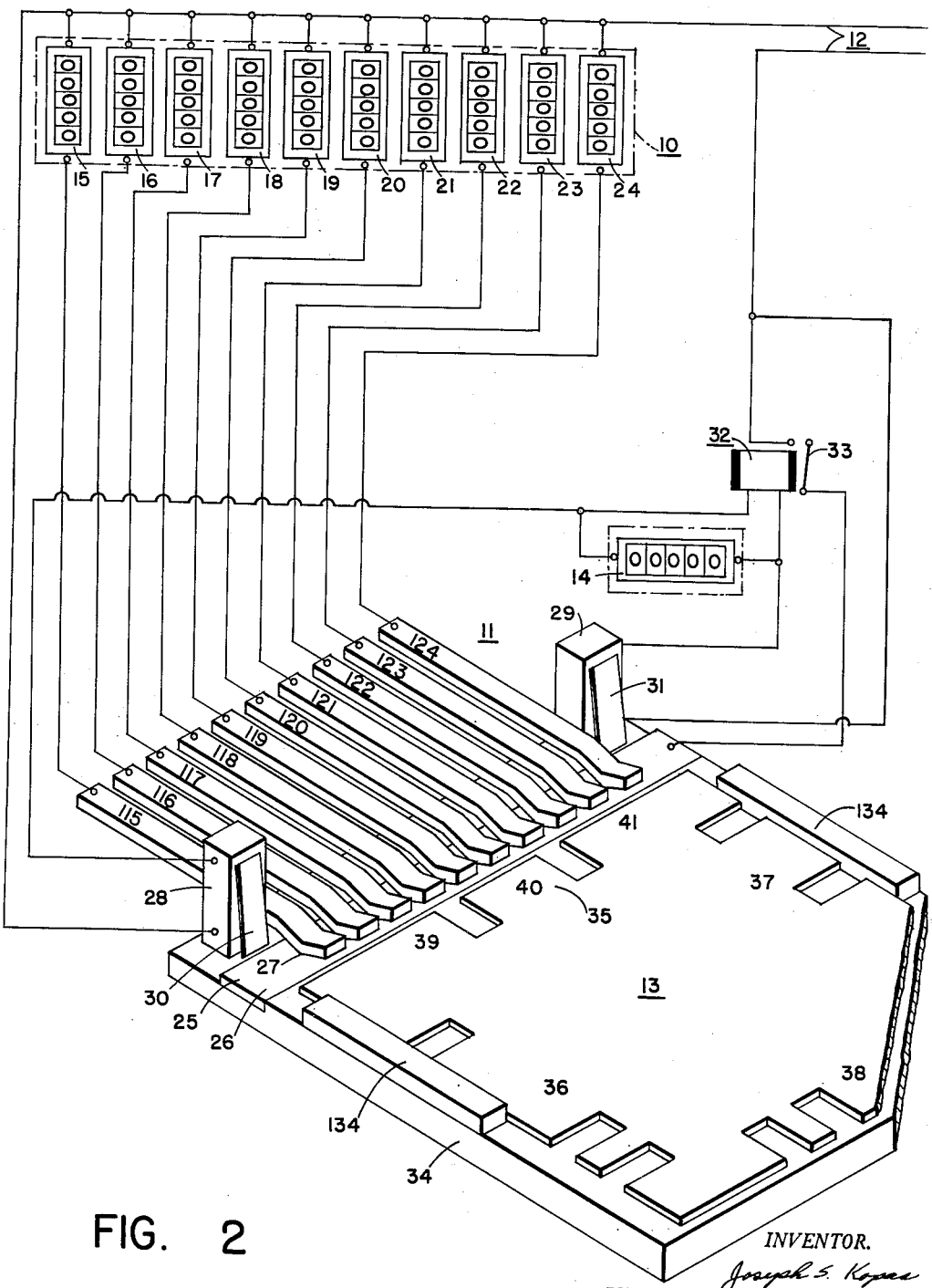
Figure 2 is a diagrammatic view illustrating a specific testing machine.

*Specific example of Figure 2*

In the specific testing machine illustrated in Figure 2, the bank of counters 10 is electrically connected through the control device 11 to the source of electrical energy 12. The control device 11 responds to a question card 13 which may be inserted therein.

The bank of counters 10 may have any number of individual counters in it; however, I have found it desirable in this particular instance to use 10 individual electric counters numbered 15 through 24, inclusive. These electric counters may be of any design or construction wherein a pulse of electricity going through the counter causes it to operate.

The control device 11 may be constructed from a plurality of pairs of spaced electrical elements or means. Each pair of elements is adapted to receive a portion of the question card therebetween to prevent operation or impulsing of its respective counter. A pair of elements not receiving a portion of the question card therebetween will cause impulsing of its respective counter.

The specific control device 11, illustrated in Figure 2, includes a plurality of fingers or contacts directly engageable with a conducting bar. The conducting bar is represented in the drawing by the reference character 25 and the fingers or contacts which directly engage the conducting bar 25 by the reference characters 115 through 124, inclusive. Each finger or contact is electrically connected to its respective counter. Each finger and the conducting bar form a specific type of a pair of spaced electrical elements.

The conducting bar 25 is described as having a face 26 including a contact face portion 27. The contact face portion 27 is that part of the face 26 which is directly engaged by the contacts 115 to 124, inclusive. The contacts 115 to 124, inclusive, are urged into engagement with this contact face portion by a spring means, which in the design illustrated in Figure 2 is the resilient properties of the fingers themselves.

I have provided an electrical switch means which may be referred to as a master switch for the control device. This switch means in this particular instance of Figure 2 comprises a pair of "micro" switches 28 and 29, located at opposite ends of the conducting bar 25. The "micro" switch 28 has an operating member 30 and a "micro" switch 29 has an operating member 31. These operating members 30 and 31 are positioned and disposed in the plans of and outside of the contact face portion 27. Although I have the use of the pair of "micro" switches for the specific construction illustrated in Figure 2, it is understood that other types of switches may be substituted for these "micro" switches. It is also understood that the number of "micro" switches or substitute switches therefor may be changed without departing from the scope of my testing machine.

The "micro" switches 28 and 29 are connected in series with a relay 32 and directly across the source of energy 12, the circuit may be traced from one side of the source of energy 12 through the "micro" switch 28, the relay 32 and "micro" switch 29 and back to the other side of the source of electrical energy 12. By using two "micro" switches in series, the operating members of both switches must be depressed at the same time to close the switch and thus energize the relay 32.

The relay 32 operates a switch 35 which controls the energization of the conducting bar 25 and thereby the energization of the bank of counters. The switch 33 is closed upon energization of the relay 32. One side of the switch 33 is electrically connected to one side of the source of energy 12 and the other side of the switch 33 is electrically connected to the conducting bar 25. Thus, the circuit for the electrical counters may be traced from one side of the source of energy 12 through the switch 33, the conducting bar 25, the fingers 115 to 124, inclusive, and through the respective electric counters 15 through 24, inclusive, and back to the other side of the source of energy 12.

Figures 3, 4:
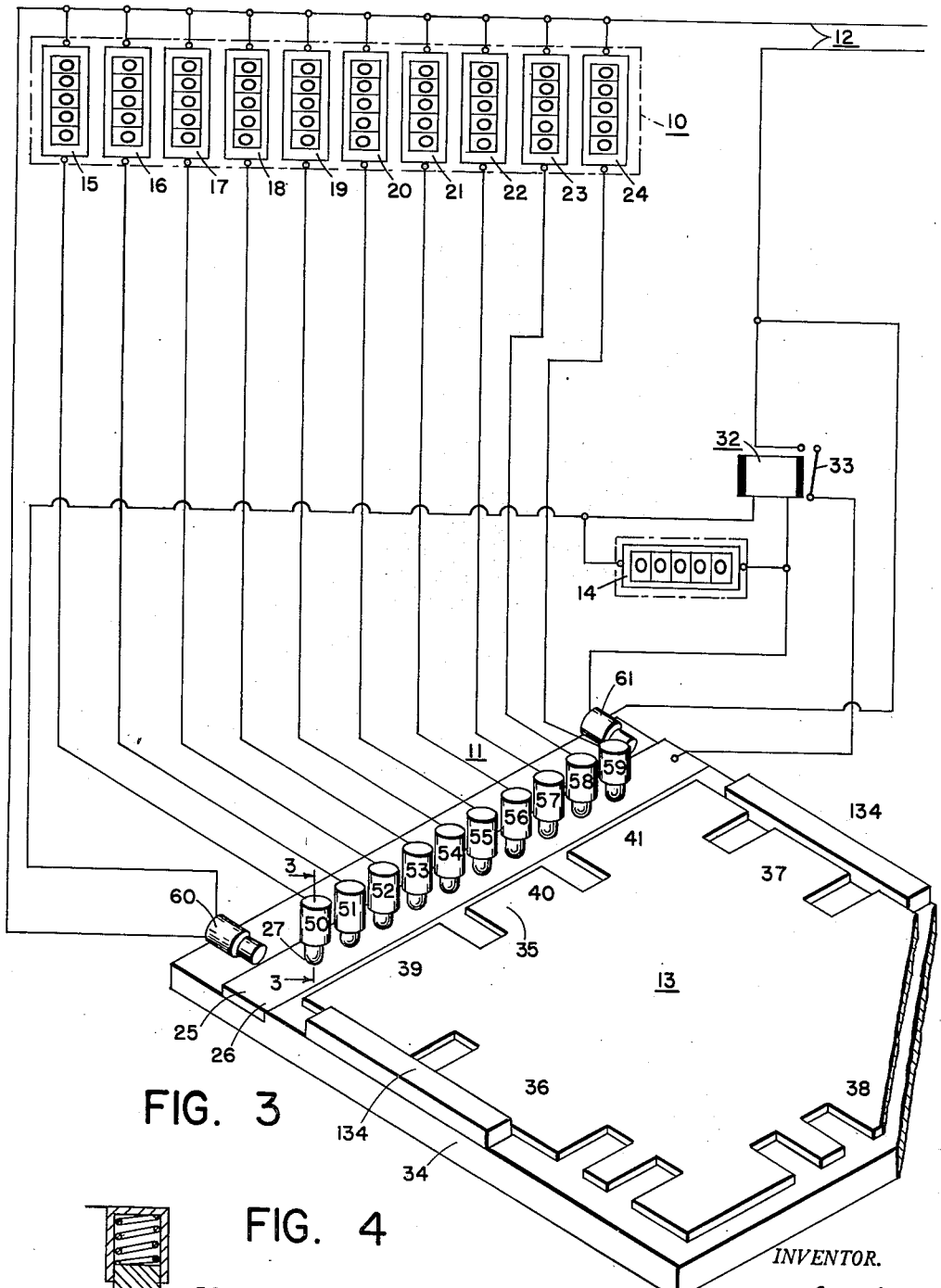
Figure 3 is a diagrammatic view of a modified testing machine.
Figure 4 is an enlarged cross-sectional view along line 3—3 of Figure 2.
Figure 5:
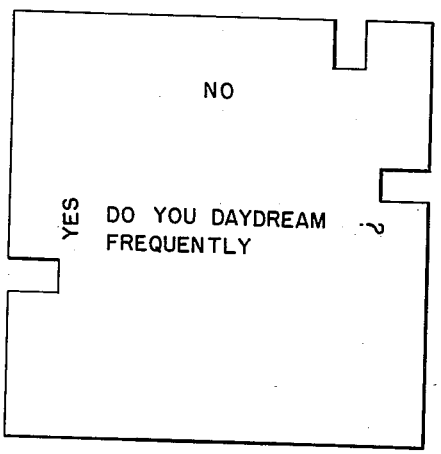
Figures 5, 6, 7 and 8 are plan views of various question cards.
Figure 6:
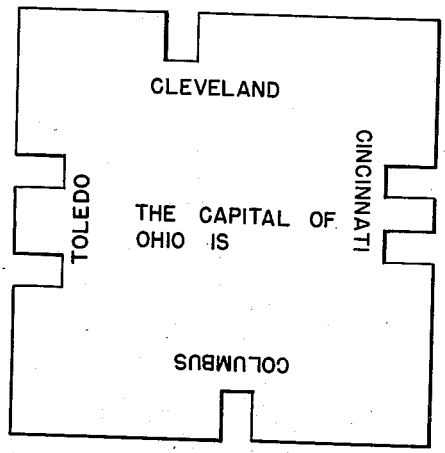
Figure 7:
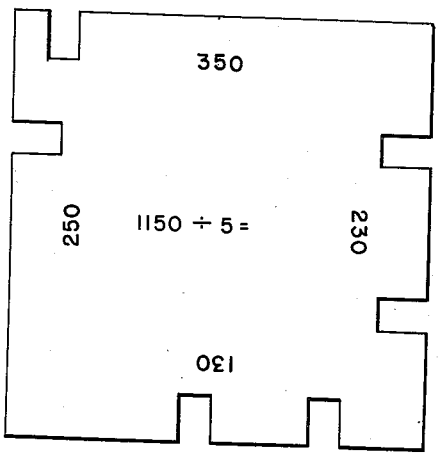
Figure 8:
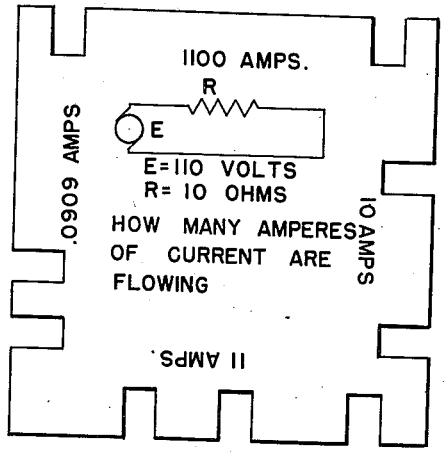

The question cards 13 are placed one at a time upon a base 34 which has a guide 134 engageable with one side of the question card 13 to conduct a correct side of the question card onto the face 26 of the conducting bar 25. In the drawings, I have illustrated a sample of one of the question cards 13 on the guide 134 and other sample question cards in the Figures 5, 6, 7 and 8. It is understood that other question cards which will be used with the machine and which will carry other questions are constructed similar to these. In this particular instance, the question cards are not connected together in a series or roll as illustrated in Figure 1. It is understood that the answer sections may be aligned as in Figure 1 and that openings or holes may be used in place of the notches herein used in the sides of the card. Each question card 13 has several sides or answer sections with each side or answer section representing a different answer to a question which may be printed on the card. Each of these sides or answer sections consists of at least one non-conducting portion when the card is used in the device as illustrated in Figures 2 and 3.

In the particular card illustrated in Figure 2, the different sides which represent possible answers are numbered 35, 36, 37 and 38, respectively. The side 35 of the card 13 has non-conducting portions 39, 40 and 41, slidable between the contacts or fingers 115, 116, 117, 119, 120, 122, 123 and 124, respectively, and the conducting bar 25. It is understood that the other sides of the cards have similar non-conducting portions in different positions so that they will slide under different contacts. The open space between the non-conducting portions 39 and 40, and between portions 40 and 41 may be referred to as notches in the side of the card. The fingers 118 and 121 contact the face of the bar through these notches to permit impulsing of the respective counters 18 and 21. It is understood that holes in the card or conductive means which will conduct electricity between the fingers and the conducting bar may be used in place of these open spaces or notches. The non-conducting portions 39, 40 and 41 space their respective contacts from the conducting bar 25 before the operating members 30 and 31 of the "micro" switches are moved. Since the "micro" switches are closed after the non-conducting portions of the card are slid between the contacts and the contact face portion 27, there will be no sparking near the conducting portions. Elimination of sparking near the conducting portion prevents burning of the edges of the cards. I have placed the operating member of the master switch means outside of the contact face portion 27 so that the card may be slid between the contacts and the contact face portion 27 prior to its engaging the contact member of the master switch means.

*Operation of specific example of Figure 2*

In operating my testing machine, illustrated in Figure 2, an operator reads a question on the card and upon deciding which answer he believes to be correct, places the card on the base 34 with one side against the guide 134 and with the side of the card representing his choice of the correct answer next adjacent the conducting bar 25. The operator next pushes the card over the face of the conducting bar 25 until the card contacts and pushes the operating members 30 and 31 of the "micro" switches 28 and 29 to close the operating switches 28 and 29, thereby energizing the relay 32. Energization of the relay 32 closes the relay switch 33 to permit energization of the conducting bar 25 and thus energization of certain of the counters in the bank of counters 10.

For example, in the illustration in Figure 2, after a person being tested has read the question which may be printed on the card 13 and has decided his answer is the answer represented by the side 35, he pushes the side 35 of the card 13 between the fingers or contacts and the conducting bar 25, and against the operating members 30 and 31. In this particular instance, the counters 18 and 21 will be energized and thereby register the answer since their respective contacts 118 and 121 directly contact the conducting bar 25. The counters 15, 16, 17, 19, 20, 22, 23 and 24 will not be energized and thus will not turn to the next higher number since their respective fingers 115, 116, 117, 119, 120, 122, 123 and 124 are spaced from the conducting bar 25. A counter 14 connected across the relay 32 is energized every time a card is pushed in the machine to count the total number of cards and thereby the total number of questions being answered.

*Modified example*

In Figure 3 of my drawings, I illustrate a modification of the structure employed in my testing machine illustrated in Figure 2. In this modification, small contacts are mounted on the ends of spring or resilient means. These contacts numbered 50 to 59, inclusive, are urged against the contact face portion 27 of the conducting bar 25 by their respective spring or resilient means. It is understood that other types of contacts which normally tend to remain against the contact face portion 27 of the conducting bar 25 may also be used in place of the fingers. This modification also positions the switches 50 to 59 and the conducting bar 25 to receive portions of a question card therebetween. One electrical element may be above the card and its respective cooperating element may be below the card when a question card is inserted in the control device.

In this modification in Figure 3, I have also used simple and inexpensive master switches, numbered 60 and 61, in place of the "micro" switches illustrated in Figure 2. As in the preferred embodiment of my invention, however, the master switch is operated after the card has been slid between the contacts and the contact face portion of the conducting bar 25. The operation of this modified machine as illustrated in Figure 2, is substantially the same as the operation of the preferred embodiment of my invention illustrated in Figure 2.

Although my invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A multiple choice question card adapted to be used in connection with a testing machine having a plurality of electrical counters controlled by a control unit, said card having a plurality of answer sections each of which represents a different possible answer to a question, each answer section having means capable of affecting the control unit and thereby making the operation of the counters dependent on which answer section is aligned with the control unit.

2. In a testing machine having a plurality of electrical counters, the provision of a conducting bar having a face including a contact face portion, a contact for each of said counters engageable with said contact face portion, spring means urging each contact into engagement with said contact face portion to electrically connect a respective counter to said conducting bar, switch means controlling the energization of said conducting bar, said switch means including an operating member disposed in the plane of and outside of said contact face portion.

3. In a testing machine, a plurality of electrical counters, a conducting bar having a face including a contact face portion, a contact for each of said counters engageable with said contact face portion, spring means urging each contact into engagement with said contact face portion to electrically connect a respective counter to said conducting bar, switch means controlling the energization of said conducting bar, said switch means including an operating member disposed in the plane of and outside of said contact face portion, a card having a plurality of answer sections with each answer section representing a different answer to a question which may be printed on the card, each answer section consisting of at least one nonconductive portion slidable between at least one contact and the conducting bar to prevent operating of at least one of said counters, the different answer sections of said card having different nonconductive portions slidable between different contacts and the bar to prevent operation of different counters and thereby make the operation of the counters dependent on which answer section of the card is placed between the contacts and the conducting bar, said card having means abuttable against said operating member of said switch means when any one of the answer sections are inserted between the contacts and the conducting bar.

4. In a testing machine, a plurality of electrical counters, a conducting bar having a face including a contact face portion, a contact for each of said counters engageable with said contact face portion, spring means urging each contact into engagement wtih said contact face portion to electrically connect a respective counter to said conducting bar, switch means controlling the energization of said conducting bar, said switch means including an operating member disposed in the plane of and outside of said contact face portion, a card having a plurality of answer sections with each answer section representing a different answer to a question which may be printed on the card, each answer section consisting of at least one conductive portion slidable between at least one contact and the conducting bar to cause operation of at least one of said counters, the different answer sections of said card having different conductive portions slidable between different contacts and the bar to cause operation of different counters and thereby make the operation of the counters dependent on which answer section of the card is placed between the contacts and the conducting bar, said card having means abuttable against said operating member of said switch means when any one of the answer sections are inserted between the contacts and the conducting bar.

5. In a testing machine, a plurality of electrical counters, a conducting bar having a face including a contact face portion, a contact for each of said counters engageable with said contact face portion, spring means urging each contact into engagement with said contact face portion to electrically connect a respective counter to said conducting bar, switch means controlling the energization of said conducting bar, said switch means including an operating member disposed in the plane of and outside of said contact face portion, a card having a plurality of sides with each side representing a different answer to a question which may be printed on the card, each side consisting of at least one nonconductive portion slidable between at least one contact and the conducting bar to prevent operating of at least one of said counters, the different sides of said card having different nonconductive portions slidable between different contacts and the bar to prevent operation of different counters and thereby make the operation of the counters dependent on which side of the card is placed between the contacts and the conducting bar, each side also having a portion abuttable against said operating member of said switch means when that side is positioned between the contacts and the bar.

6. In a testing machine having a plurality of electrical counters, a control device for controlling the operation of said counters, said device including a conducting bar and a plurality of spaced fingers with each finger connectable to a respective counter, each of said fingers having resilient properties tending to hold the fingers in contact with the conducting bar and thereby conduct current through the respective counters to operate the same, a card having a plurality of sides with each side representing a different answer to a question which may be printed on the card, each side consisting of at least one nonconductive portion slidable between at least one finger and the conducting bar to prevent operating of at least one of said counters, the different sides of said card having different nonconductive portions slidable between different fingers and the bar to prevent operation of different counters and thereby make the operation of the counters dependent on which side of the card is placed between the fingers and the conducting bar.

7. In a testing machine having a plurality of electrical counters, a control device for controlling the operation of said counters, said device including a conducting bar and a plurality of spaced fingers with each finger connectable to a respective counter, each of said fingers having resilient properties tending to hold the fingers in contact with the conducting bar and thereby conduct current through the respective counters to operate the same, a card having a plurality of sides including a first side with each side representing a different answer to a question which may be printed on the card, at least said first side having an open space therein permitting at least one finger to maintain direct contact with the conductor bar when said first side of said card is inserted between the fingers and the conductor bar to conduct current through at least one of said counters and thereby register the answer represented by said first side.

8. In a testing machine having a plurality of electrical counters, the provision of a conducting bar having a face including a contact face portion, a contact for each of said counters, engageable with said contact face portion, spring means urging each contact into engagement with said contact face portion to electrically connect a respective counter to said conducting bar, switch means controlling the energization of said conducting bar, said switch means including an operating member disposed in the plane of and outside of said contact face portion, a card having a plurality of sides including a first side with each side representing a different answer to a question which may be printed on the card, at least said first side having a notch therein permitting at least one contact to maintain direct contact with the contact face portion of the conductor bar when said first side of said card is inserted between the contacts and the conductor bar to conduct current through at least one of said counters and thereby register the answer represented by said first side, each side also having a portion abuttable against said operating member of said switch means when that side is positioned between the contacts and the conducting bar.

9. In a testing machine having a plurality of counters, a multiple choice question card having a plurality of answer sections, each of which represents a different answer to a question, a control unit connected to said counters for controlling the operation thereof, a control unit energization switch controlling the energization of said control unit, means in said card causing operation of said energization switch when any one of said answer sections are aligned with said control unit, and means in each of said answer sections affecting said control unit and thereby making the operation of said counters dependent on the answer section affecting the control unit.

10. In a testing machine, a plurality of electrically energizable counters, a question card having at least one answer section, a control unit responsive to said answer section and controllingly connected in electrical circuit with said counters, a control unit energization switch controlling the energization of said control unit, means in said card causing operation of said energization switch when said answer section is aligned with said control unit.

11. In a testing machine, a plurality of counters, a control unit controlling the operation of said counters, and a plurality of question cards each having a plurality of answer sections, a control unit energization switch controlling the energization of said control unit, means in each card causing operation of said energization switch when any one of said answer sections in that card are aligned with said control unit, each of said answer sections representing a different answer to a question and affecting said control unit causing same to control the operation of said counters.

12. In a testing machine, a plurality of electrically energizable counters, question cards, each having answer sections representing different answers to a question, a control unit controllingly connected in electrical circuit with said counters and affected by the answer sections, thus making the operation of the counters dependent on the answer sections representing the assumed correct answers, a control unit energization switch controlling the energization of said control unit, means in each card causing operation of said energization switch when any one of said answer sections in that card are aligned with said control unit.

13. A multiple choice examination question card adapted to be used with a testing machine having a plurality of counters controlled by an electrical counter control unit, said card consisting of a single flat sheet of material incorporating therein a question section and a plurality of answer sections, each answer section representing a different possible answer to a question on the question section and with one of the answer sections representing the correct answer to said question, and influencing means arranged differently in each answer section and each capable of influencing an electrical counter control unit aligned with that answer section to make the operation of the counters in a testing machine dependent on which answer section is aligned with the control unit.

14. A multiple choice examination question card adapted to be used with a testing machine having a plurality of counters controlled by an electrical counter control unit, said card consisting of a single flat sheet of material incorporating therein a question section and a plurality of marginal sides, each marginal side representing a different possible answer to a question on the question section and with one of the marginal sides representing the correct answer to said question, and influencing means arranged differently in each marginal side and each capable of influencing an electrical counter control unit aligned with that marginal side to make the operation of the counters in a testing machine dependent on which marginal side is aligned with the control unit.

15. A multiple choice examination question card adapted to be used with a testing machine having a plurality of counters controlled by an electrical counter control unit, said card consisting of a single flat sheet of material incorporating therein a question section and a plurality of answer sections, each answer section representing a different possible answer to a question on the question section and with one of the answer sections representing the correct answer to said question, means in said card capable of causing operation of a control unit energization switch when any one of the marginal sides are aligned with the control unit, and influencing means arranged differently in each answer section and each capable of influencing an electrical counter control unit aligned with that answer section to make the operation of the counters in a testing machine dependent on which answer section is aligned with the control unit.

16. A multiple choice examination question card adapted to be used with a testing machine having a plurality of counters controlled by an electrical counter control unit, said card consisting of a single flat sheet of material incorporating therein a question section and a plurality of marginal sides, each marginal side representing a different possible answer to a question on the question section and with one of the marginal sides representing the correct answer to said question, means in said card capable of causing operation of a control unit energization switch when any one of the marginal sides are aligned with the control unit, and influencing means arranged differently in each marginal side and each capable of influencing an electrical counter control unit aligned with that marginal side to make the operation of the counters in a testing machine dependent on which marginal side is aligned with the control unit.

17. A multiple choice examination question card adapted to be used with a testing machine having a plurality of counters controlled by an electrical counter control unit, said card consisting of a single flat sheet of material incorporating therein a question section and a plurality of marginal sides, each marginal side representing a different possible answer to a question on the question section and with one of the marginal sides representing the correct answer to said question, each marginal side having a portion capable of operating a control unit energization switch with the portions in all marginal sides positioned similarly in their respective sides, and influencing means arranged differently in each marginal side and each capable of influencing an electrical counter control unit aligned with that marginal side to make the operation of the counters in a testing machine dependent on which marginal side is aligned with the control unit.

JOSEPH S. KOPAS.

REFERENCES CITED

The following references are of record in the file of this patent:

UNITED STATES PATENTS

| Number | Name | Date |
|---|---|---|
| 2,048,976 | Sveda et al. | July 28, 1936 |
| 2,150,256 | Warren | Mar. 14, 1939 |
| 2,288,770 | Armbruster | Jan. 7, 1942 |
| 2,340,251 | Nesbit | Jan. 25, 1944 |